US012737771B2

(12) United States Patent
Doki et al.

(10) Patent No.: US 12,737,771 B2
(45) Date of Patent: Sep. 15, 2026

(54) SYSTEMS AND METHODS FOR GOAL ACHIEVEMENT APPLICATIONS

(71) Applicant: Wells Fargo Bank, N.A., San Francisco, CA (US)

(72) Inventors: Srinivas R. Doki, San Francisco, CA (US); Chris A. Feathers, San Francisco, CA (US); Debashis Ghosh, Charlotte, NC (US); Rukiya Kelly, San Francisco, CA (US); Justin Morris Krieger, San Francisco, CA (US); Heidi Schmitz, San Francisco, CA (US); Richard Claude Robert Trent, Newton, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 98 days.

(21) Appl. No.: 18/239,881

(22) Filed: Aug. 30, 2023

(65) Prior Publication Data

US 2025/0078088 A1 Mar. 6, 2025

(51) Int. Cl.
*G06Q 30/015* (2023.01)

(52) U.S. Cl.
CPC .................................. *G06Q 30/015* (2023.01)

(58) Field of Classification Search
CPC .................................................... G06Q 30/015
See application file for complete search history.

(56) References Cited

U.S. PATENT DOCUMENTS

2011/0218960 A1* 9/2011 Hatami-Hanza .... G06F 16/9536 707/603
2013/0311222 A1* 11/2013 Chaturvedi ........ G06Q 10/0639 705/7.15
2014/0164218 A1 6/2014 Stewart
2017/0061535 A1 3/2017 Williams
2017/0345089 A1* 11/2017 Wu ......................... G06T 19/00

(Continued)

OTHER PUBLICATIONS

Pankaj M. Madhani, Building a Customer Focused Strategy: Developing Conceptual Frameworks and Research Propositions, 2020, p. 1-3 (Year: 2020).*

(Continued)

*Primary Examiner* — Ibrahim N El-Bathy
(74) *Attorney, Agent, or Firm* — Foley & Lardner LLP

(57) ABSTRACT

A computer-implemented method includes determining, by a provider computing system associated with a provider, a goal of a first customer. The computer-implemented method further includes identifying, by the provider computing system, one or more second customers similar to the first customer based on a characteristic of the first customer. The computer-implemented method further includes determining, by the provider computing system, one or more actions taken by the one or more second customers to achieve the goal. The computer-implemented method further includes generating, by the provider computing system, a graphical user interface including an indication of the one or more actions taken by the one or more second customers to achieve the goal. The computer-implemented method further includes transmitting, by the provider computing system, the graphical user interface to a customer device associated with the first customer.

20 Claims, 6 Drawing Sheets

(56) References Cited

U.S. PATENT DOCUMENTS

| | | | | |
|---|---|---|---|---|
| 2018/0285837 | A1* | 10/2018 | Wu | G06Q 20/3829 |
| 2021/0158378 | A1* | 5/2021 | Jones | G16H 20/30 |
| 2021/0365969 | A1* | 11/2021 | Lieu | G06Q 30/0201 |
| 2022/0058733 | A1 | 2/2022 | Ukropina | |
| 2022/0245721 | A1* | 8/2022 | Horesh | G06Q 40/02 |
| 2022/0318327 | A1 | 10/2022 | Caro et al. | |
| 2023/0043430 | A1* | 2/2023 | Ben David | G06F 9/44 |
| 2023/0043578 | A1* | 2/2023 | Lee | G01C 21/3623 |
| 2023/0334373 | A1* | 10/2023 | Coyne | G06Q 40/06 |

OTHER PUBLICATIONS

Pinar Yildirim et al., “Credit Scoring With Social Network Data”, Jan. 2014, https://www.researchgate.net/publication/272300274, 27 pages (Year: 2014).

* cited by examiner

SYSTEMS AND METHODS FOR GOAL ACHIEVEMENT APPLICATIONS

TECHNICAL FIELD

Aspects and embodiments of the present disclosure relate to systems and methods for goal achievement applications.

BACKGROUND

Customers have a variety of differing goals. For example, some customers may desire to raise their credit scores, save for a particular occasion (e.g., retirement, college funds), reduce their outstanding debt, etc. While information pertaining to achieving various goals may be generally available, finding information relevant to a given customer's particular circumstances is generally difficult to find. Furthermore, once customers find pertinent information, they may still find it difficult to stay on track (e.g., follow a recommended course of action) while attempting to achieve those goals.

SUMMARY

One embodiment relates to a computer-implemented method. The computer-implemented method includes determining, by a provider computing system associated with a provider, a goal of a first customer. The computer-implemented method further includes identifying, by the provider computing system, one or more second customers similar to the first customer based on a characteristic of the first customer. The computer-implemented method further includes determining, by the provider computing system, one or more actions taken by the one or more second customers to achieve the goal. The computer-implemented method further includes generating, by the provider computing system, a graphical user interface including an indication of the one or more actions taken by the one or more second customers to achieve the goal. The computer-implemented method further includes transmitting, by the provider computing system, the graphical user interface to a customer device associated with the first customer.

Another embodiment relates to a provider computing system associated with a provider. The provider computing system comprises one or more processing circuits including one or more processors coupled to one or more memory devices, the one or more memory devices having instructions stored thereon that, when executed by the one or more processors, cause the one or more processors to determine a goal of a first customer. The instructions further cause the one or more processors to identify one or more second customers similar to the first customer based on a characteristic of the first customer. The instructions further cause the one or more processors to determine one or more actions taken by the one or more second customers to achieve the goal. The instructions further cause the one or more processors to generate a graphical user interface including an indication of the one or more actions taken by the one or more second customers to achieve the goal. The instructions further cause the one or more processors to transmit the graphical user interface to a customer device associated with the first customer.

Still another embodiment relates to a non-transitory computer-readable medium having instructions stored thereon that, when executed by at least one processing circuit of a provider computing system associated with a provider, cause operations including determining a goal of a first customer.

The operations further include identifying one or more second customers similar to the first customer based on a characteristic of the first customer. The operations further include determining one or more actions taken by the one or more second customers to achieve the goal. The operations further include generating a graphical user interface including an indication of the one or more actions taken by the one or more second customers to achieve the goal. The operations further include transmitting the graphical user interface to a customer device associated with the first customer.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Figure 1:
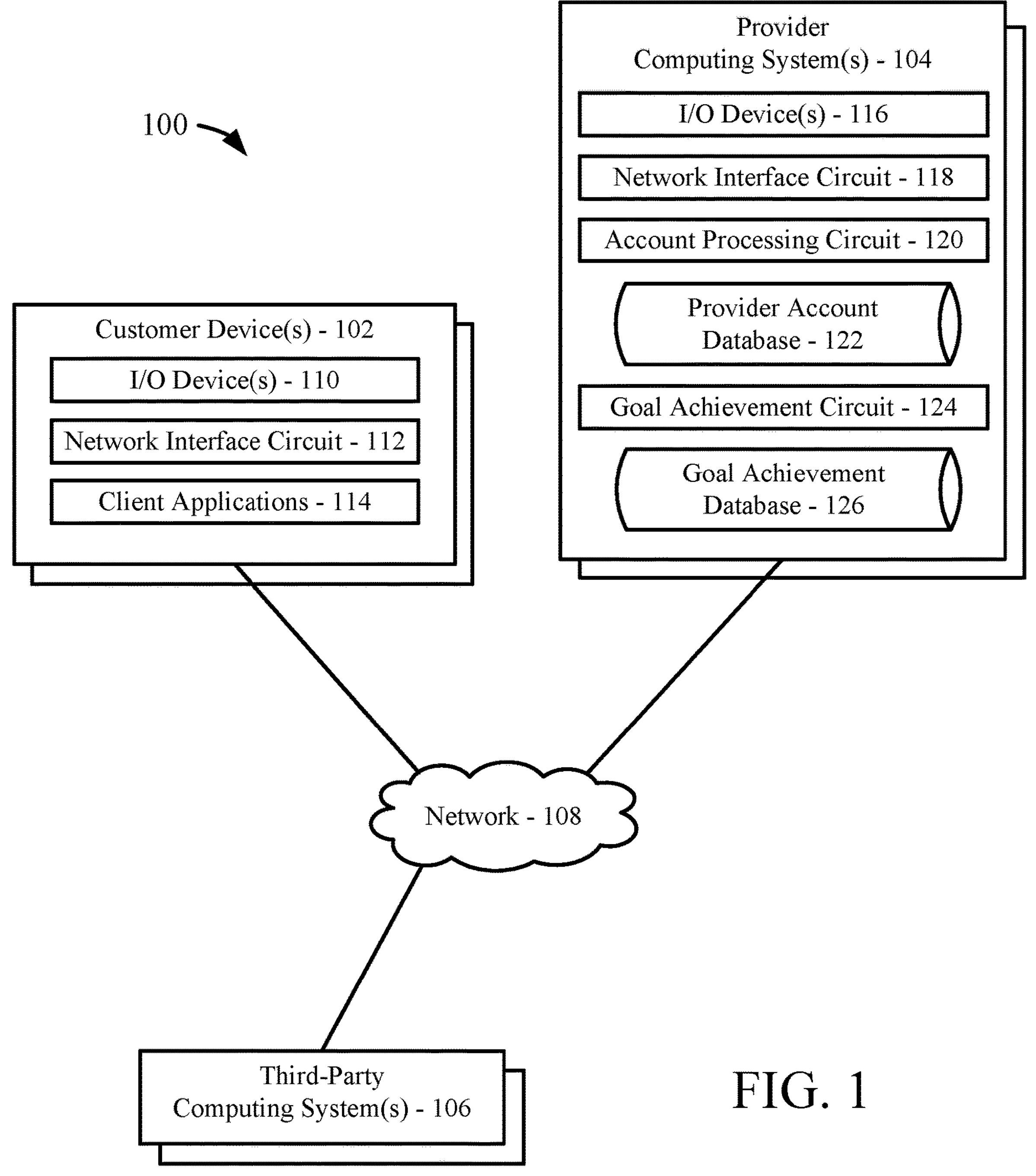
FIG. 1 is a block diagram of a computing environment that allows for various goal achievement incentive applications, according to an example embodiment.

Referring generally to the figures, systems and methods for aiding and incentivizing customers to achieve various goals are disclosed according to various embodiments herein. In some instances, the systems and methods described herein allow for customers to receive advice from and/or recommendations for how to achieve various goals based on other customers who are similarly situated (e.g., having similar backgrounds, occupations, income levels) who have achieved the same or similar goals in the past. In some instances, along with displaying the advice and/or recommended actions to the customer, the systems and methods described herein further provide customers with corresponding links to follow the advice and/or perform the recommended actions associated with achieving their goals directly from the same user interface.

In some embodiments, the systems and methods described herein allow for customers to join customer accountability groups of customers that are each focused on pursing a similar goal and have a similar background. For example, in some instances, the customer groups may be supported by a goal achievement platform provided by a provider institution (e.g., within an application or via a provider website). Within the customer groups, customers can see other customer's progress, share testimonials about progress and corresponding actions taken, view recommended actions, and interact with other users to discuss customer goals. Further, in some instances, the systems and methods described herein may provide various customer challenges and rewards based on customer groups achieving corresponding established group goals (e.g., the group collectively raising their credit scores by a total of 1,000 points).

Accordingly, the systems and methods described herein provide a variety of improvements to performance tracking system and interface technology. For example, traditional performance tracking systems and interfaces have not been configured to automatically identify and provide various recommended actions for customers to take to achieve selected goals based on similarly situated customers' actions used to successfully achieve those goals in the past. As such, customers have traditionally not had access to the most relevant information for their particular circumstances. Further, traditional performance tracking systems and interfaces have not allowed similarly situated customers working toward similar goals to form collaborative customer group pages that provide communication channels between the customers for sharing advice and experiences working toward those similar goals. Additionally, traditional performance tracking systems and interfaces have not tracked, provided indications of, and rewarded collective group progress toward corresponding group goals.

However, the systems and methods described herein solve these issues by automatically providing recommendations using artificial intelligence, or more specifically, machine learning models trained to assess actions taken by similarly situated customers to achieve similar goals and provide recommended actions that helped those similarly situated customers achieve those similar goals. The systems and methods described herein further solve these issues by providing a goal achievement platform that provides a collaborative space where customers can share advice and experiences working toward their respective goals. The goal achievement platform further tracks, provides indications of, and rewards collective group progress toward corresponding group goals, thereby incentivizing group members to continue working toward their respective goals and also to help other group members achieve their goals.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 is a diagram of a computing environment 100 that allows for a variety of goal-achievement incentive applications. As shown, the computing environment 100 includes one or more customer devices 102, a provider computing system 104, and one or more third-party computing systems 106. The one or more customer devices 102, the provider computing system 104, and the one or more third-party computing systems 106 are in communication with each other and are connected by a network 108.

Although various systems and/or devices are shown in FIG. 1 as being (e.g., customer devices 102, provider computing systems 104), it will be understood that, in some instances, the computing environment 100 may include one or multiple of any of the various illustrated systems and/or devices, as desired for a given application. Further, while the following descriptions of the various systems and devices are largely provided in terms of single systems or devices, it will be appreciated that these descriptions are similarly applicable to any additional corresponding systems and/or devices (e.g., additional customer devices 102, additional provider computing systems 104, and so on).

The customer device 102 is owned, operated, controlled, managed, and/or otherwise associated with a customer (e.g., a customer of a provider institution associated with the provider computing system 104). In some embodiments, the customer device 102 may be or may comprise, for example, a desktop or laptop computer (e.g. a tablet computer), a smartphone, a wearable device (e.g., a smartwatch), a personal digital assistant, and/or any other suitable computing device.

In some embodiments, the customer device 102 includes one or more I/O devices 110, a network interface circuit 112, and one or more client applications 114. While the term "I/O" is used, it should be understood that the I/O devices 110 may be input-only devices, output-only devices, and/or a combination of input and output devices. In some instances, the I/O devices 110 include various devices that provide perceptible outputs (such as display devices with display screens and/or light sources for visually-perceptible elements, an audio speaker for audible elements, and haptics or vibration devices for perceptible signaling via touch, etc.), that capture ambient sights and sounds (such as digital cameras, microphones, etc.), and/or that allow the customer to provide inputs (such as a touchscreen display, stylus, keyboard, force sensor for sensing pressure on a display screen, etc.). In some instances, the I/O devices 110 further comprise one or more user interfaces (devices or components that interface with the customer), which may include one or more biometric sensors (such as a fingerprint reader, a heart monitor that detects cardiovascular signals, face scanner, an iris scanner, etc.).

The network interface circuit 112 includes, for example, program logic and various devices (e.g., transceivers, etc.) that connect the customer device 102 to the network 108. The network interface circuit 112 facilitates secure communications between the customer device 102 and each of the provider computing system 104 and the one or more third-party computing systems 106. The network interface circuit 112 also facilitates communication with other entities, such as other banks, settlement systems, and so on.

The customer device 102 stores in computer memory, and executes ("runs") using one or more processors, various customer client applications 114, such as an Internet browser presenting websites, text messaging applications, and/or applications provided or authorized by entities implementing or administering any of the computing systems in computing environment 100.

For example, in some instances, the customer client applications 114 comprise a customer provider client application (e.g., a financial institution banking application) provided by and at least partly supported by the provider computing system 104. For example, in some instances, the customer client application 114 coupled to the provider computing system 104 may enable the customer to perform various customer activities (e.g., account management, account opening and/or closing actions, account withdrawals and deposits) and/or perform various transactions (e.g., the customer making a mortgage payment, the customer sending funds to a recipient, the customer receiving funds from a sender, etc.) associated with one or more customer financial accounts of the customer held at a current provider institution associated with the provider computing system 104. In some instances, the customer provider client application (e.g., the customer client application 114) may further allow the customer to perform various functionalities described herein.

In some other instances, the customer client application 114 provided by the provider computing system 104 may additionally be coupled to one or more third-party computing systems 106 (e.g., via one or more application programming interfaces (APIs) and/or software development kits (SDKs)) to integrate one or more features or services provided by the third-party computing system(s) 106 (e.g., to request real-time credit information from a credit bureau computing system).

The provider computing system 104 is owned by, associated with, or otherwise operated by a provider institution (e.g., a bank or other financial institution) that maintains one or more accounts held by various customers (e.g., the customer associated with the customer device 102), such as demand deposit accounts, credit card accounts, receivables accounts, and so on. The provider computing system 104 may, for example, comprise one or more servers, each with one or more processing circuits having one or more processors configured to execute instructions stored in one or more memory devices to send and receive data stored in the one or more memory devices and perform other operations to implement the methods described herein associated with logic or processes shown in the figures. In some instances, the provider computing system 104 may comprise and/or have various other devices communicably coupled thereto, such as, for example, desktop or laptop computers (e.g., tablet computers), smartphones, wearable devices (e.g., smartwatches), and/or other suitable devices.

In some embodiments, the provider computing system 104 includes one or more I/O devices 116, a network interface circuit 118, an account processing circuit 120, a provider account database 122, a goal achievement circuit 124, and a goal achievement database 126. The one or more I/O devices 116 are configured to receive inputs from and display information to a user. While the term "I/O" is used, it should be understood that the I/O devices 116 may be input-only devices, output-only devices, and/or a combination of input and output devices.

In some instances, the network interface circuit 118 includes, for example, program logic that connects the provider computing system 104 to the network 108. The network interface circuit 118 facilitates secure communications between the provider computing system 104 and each of the customer device(s) 102 and the third-party computing system(s) 106. The network interface circuit 118 also facilitates communication with other entities, such as other banks, settlement systems, and so on. The network interface circuit 118 further includes user interface program logic configured to generate and present web pages to users accessing the provider computing system 104 over the network 108.

The account processing circuit 120 is structured or configured to perform a variety of functionalities or operations to enable and monitor various customer activities (e.g., account processing, product registration processing, account monitoring, etc.) in connection with customer account information stored within a provider account database 122. In some instances, the account processing circuit 120 performs various functionalities to enable account opening and/or closing actions, product registration actions (e.g., registering for a goal achievement application), account withdrawals and deposits (e.g., account credits and debits to checking and savings accounts), various customer account tracking activities, and/or a variety of other services associated with and/or provided by the provider.

The provider account database 122 is structured or configured to retrievably store customer account information associated with various customer accounts held or otherwise maintained by the current provider institution on behalf of its customers. In some instances, the customer account information includes both customer information and account information pertaining to a given customer account. For example, in some instances, the customer information may include a name, a phone number, an e-mail address, a physical address, a transaction history, an income level, a disposable income level, an occupation, an age, a net worth, an education level, a marital status, a number of dependents, a credit score, etc. of the customer associated with the customer account. In some instances, the account information may include balance information, transaction information, information pertaining to the type and corresponding capabilities of the given account, etc.

The goal achievement circuit 124 is structured to enable various functionalities described herein. For example, in some instances, the goal achievement circuit 124 is structured to generate a collaborative goal achievement platform and various associated user interfaces (e.g., user interfaces 400, 500, 600, 700 shown in FIGS. 4-7) configured to allow for various customers to collaborate and learn from one another to achieve a variety of desired customer goals (e.g., raising a customer credit score, reducing spending habits, saving a desired amount of money), as will be described in detail below.

The goal achievement database 126 is structured or configured to retrievably store various customer-goal-related information associated with customers, corresponding customer goals, and various actions customers have taken to achieve those goals. For example, in some instances, the customer-goal-related information may include goal achievement data and corresponding customer action data. The goal achievement data can include a goal set or achieved by a customer, a timeframe within which the goal was achieved, a level of progress achieved by the customer, and/or any other relevant goal achievement data. In some instances, as discussed above, the goal may be raising a customer credit score to a desired threshold, reducing one or more spending habits below a desired threshold, paying off a certain amount of debt, and/or saving a desired amount of money (e.g., for retirement, education, a wedding). The customer action data can include one or more actions taken by the customer to achieve the corresponding goal. For example, in some instances, the one or more actions may be opening or closing one or more credit accounts, requesting one or more credit limit increases, With an example structure of the computing environment 100 being described above, example processes performable by the computing environment 100 (or components/systems thereof) will be described below. It should be appreciated that the following processes are provided as examples and are in no way meant to be limiting. Additionally, various method steps discussed herein may be performed in a different order or, in some instances, completely omitted.

These variations have been contemplated and are within the scope of the present disclosure.

Figure 2:
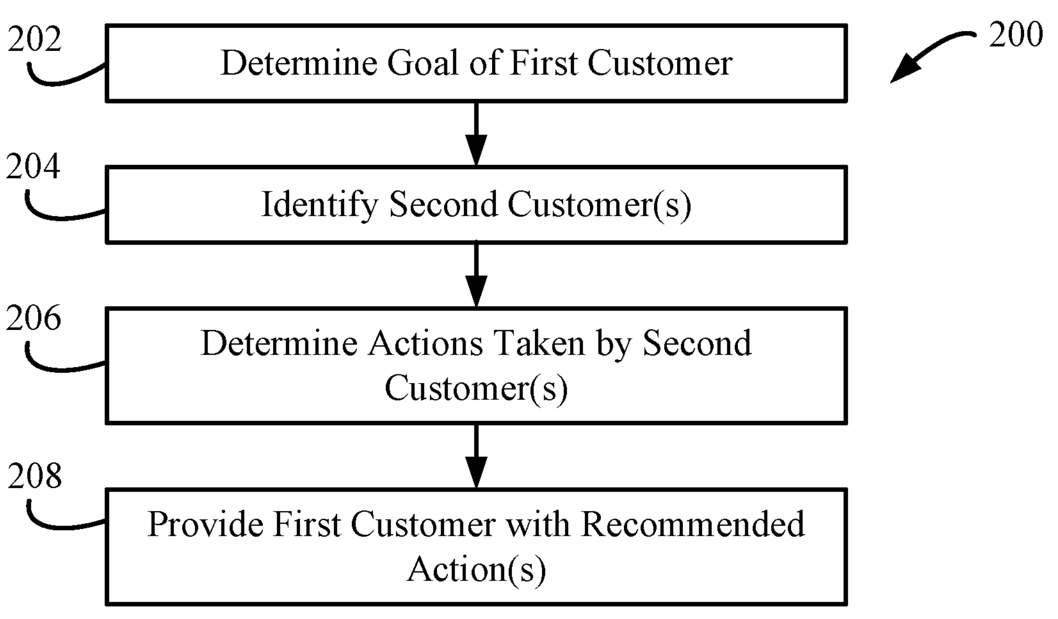
FIG. 2 is flow diagram of a method for providing a goal achievement user interface, according to an example embodiment.

Referring now to FIG. 2, a flow diagram of a method 200 for providing a goal achievement user interface is shown, according to an example embodiment. For example, the method 200 relates to determining a goal of a first customer or user, identifying similar customers or users who have achieved or made progress toward the same or a similar goal, determining actions taken by those customers to achieve or make progress toward the same or similar goal, and generating an interactive goal achievement user interface including advice and/or motivation for the customer to achieve their goal.

As shown, the method 200 begins by the provider computing system 104 determining a goal of a first customer, at step 202. For example, the goal may be provided to the provider computing system 104 by the first customer using the customer device 102 (e.g., via the user interface 400 shown in FIG. 4). In some instances, the goal may be provided verbally or through some other kind of interaction between the customer and the provider institution (e.g., during a branch visit). In some instances, the goal may be inferred from information about the customer. For example, the provider computing system 104 may determine that the customer has habitually run a low balance in their account (e.g., a customer account stored within the provider account database 122). In this instance, the provider computing system 104 may infer that the customer would like to decrease their spending habits. In some instances, the provider computing system 104 may determine that the customer has a credit score below a predetermined threshold credit score (e.g., 500) when the customer performs a credit check using the provider computing system 104. In this instance, the provider computing system 104 may infer that the customer would like to increase their credit score.

Once the goal has been determined, at step 202, the provider computing system 104 identifies one or more second customers with similar characteristics to the first customer, at step 204. For example, in some instances, the provider computing system 104 (e.g., the goal achievement circuit 124) may identify the one or more second customers based on the one or more second customers living in the same geographic regions and/or having the same or similar goals, transaction histories (e.g., making similar purchases or shopping at similar merchants), income levels, disposable income levels, occupations, ages, net worths, education levels, marital statuses, number of dependents, credit scores, and/or any other suitable grouping characteristics, as desired for a given scenario.

Once the one or more second customers have been identified, at step 204, the provider computing system 104 then determines various actions taken by the second customers, at step 206. In some instances, the provider computing system 104 may determine the actions taken by the second customers based on testimonials provided by the second customers (e.g., via one or more associated customer devices 102). For example, the provider computing system 104 (e.g., the goal achievement circuit 124) may automatically elicit testimonials from customers who successfully reach a given goal (e.g., raising their credit score about 650) or make a predetermined level of progress toward a goal in a predetermined amount of time (e.g., raising their credit score by 50 points in a month).

As an example, the provider computing system 104 may monitor customer accounts stored within the provider account database 122 to track various customer goal metrics associated with different potential goals (e.g., customer credit scores, outstanding customer debt, customer savings, customer spending habits). Upon detecting that a customer has reached a given goal or has made a predetermined level of progress toward the goal in a predetermined amount of time, the provider computing system 104 (e.g., the goal achievement circuit 124) may automatically generate and transmit a request to a corresponding customer device 102 for a testimonial from the associated customer. Accordingly, the goal achievement circuit 124 may then receive the testimonial (e.g., a text-based testimonial or verbally given testimonial recording) from the customer device 102. The goal achievement database 126 may then store the testimonial associated with the customer within the goal achievement database 126 and associate the testimonial with the customer and the corresponding goal achieved.

In some instances, the testimonials received from customers may include actions taken by the customers to achieve their respective goals (e.g., "I requested credit limits on all of my qualifying accounts to reduce my credit usage percentage"), as well as resulting effects of achieving their goals (e.g., "By increasing my credit score, I was able to get a 2% lower mortgage rate on my house!"). In some instances, the requests for testimonials from customers may include various specific feedback requests based on common questions asked by other customers. For example, a common question from customers attempting to increase their credit scores may be "how can I increase my credit score without paying down my outstanding debts?" Accordingly, the request for testimonials from customers in the context of improving credit scores may include a prompt asking "apart from paying down your outstanding debts, what have you done to increase your credit score?"

In some instances, the goal achievement circuit 124 may determine the various actions taken by the second customers using one or more machine learning models. For example, in some instances, the goal achievement circuit 124 may receive training data associated with a plurality of customers. The training data may include goal achievement training data and action training data compiled or aggregated over time from the plurality of customers and corresponding customer accounts. In some instances, the goal achievement training data may indicate a given customer's advancement toward a given goal. The action training data may indicate one or more actions taken by each customer at or near the time the customer achieved the corresponding goal or made progress toward the goal. Accordingly, using the machine learning model of the goal achievement circuit 124 can be trained using the training data to determine and/or identify actions associated with achieving various customer goals. In some instances, the machine learning model of the goal achievement circuit 124 can be trained to specifically note which customers have achieved the customer goals the fastest and which actions have been the most helpful for advancing toward each given customer goal. As will be described below, in some instances, the machine learning model can be continuously trained based on action advice given to customers and those customers' tracked advancement toward the corresponding customer goals.

Finally, the provider computing system 104 provides the first customer with one or more recommended actions, at step 208. For example, the goal achievement circuit 124 may be configured to provide the recommended actions to the first customer via a user interface (e.g., the user interface 500 shown in FIG. 5) displayed on the customer device 102. In some instances, the goal achievement circuit 124 provides one or more specific examples of actions the customer can perform to advance toward a particular goal. For example, if the first customer has a credit score of 650, and the customer wants to increase their credit score to at least 720, the goal achievement circuit 124 can identify similar customers who have credit scores of at least 720 and indicate various actions those customers have taken to achieve that credit score (e.g., pay off past-due accounts, reduce credit usage percentage).

In some instances, the customer may further indicate a timeframe within which they would like to achieve a specific goal (e.g., via a user interface similar to the user interface 400). In these instances, the goal achievement circuit 124 may identify similar customers, as described above with respect to step 204, but may further filter those identified customers to only include information collected from customers who have achieved the same goal within the desired timeframe. Accordingly, the recommended actions provided to the customer may be tailored specifically to the goal and timeframe for achieving that goal specified by the customer.

In some instances, the goal achievement circuit 124 is configured to monitor each customer's progress toward their respective customer goals in response to the customer performing the one or more recommended actions. That is, if the goal achievement circuit 124 provides the customer with a first recommended action (e.g., reduce your credit usage percentage) and the customer performs an associated action (e.g., the customer obtains a credit limit increase on one or more of their credit accounts), the goal achievement circuit 124 may track the customer's subsequent progress toward their goal (e.g., their credit score increase) to determine whether the action was, in fact helpful. The goal achievement circuit 124 may further use the customer's progress toward the customer goal and the associated actions taken as feedback inputs to continuously train the machine learning model discussed above. By continuously training the machine learning model, the goal achievement circuit 124 is capable of providing up-to-date recommended actions based on continuously obtained training data. As such, a recommended action that worked to achieve a particular goal five years ago but is no longer useful for achieving that goal is not provided to the customer based on an outdated training.

Additionally, in some instances, the goal achievement circuit 124 is configured to provide one or more incentives to customers attempting to achieve corresponding customer goals. For example, the incentives may include one or more rewards for achieving or making progress toward various customer goals. For example, if the customer is attempting to increase their credit score, the goal achievement circuit 124 may transmit a notification to the customer that, if the customer raises their credit score by a predetermined amount (e.g., 50 points) or above a predetermined threshold (e.g., 650 points), the provider institution will provide the customer with a reward, such as, for example, a monetary reward (e.g., a cash reward), a lower rate on a loan (e.g., a home mortgage), etc.

Figure 3:
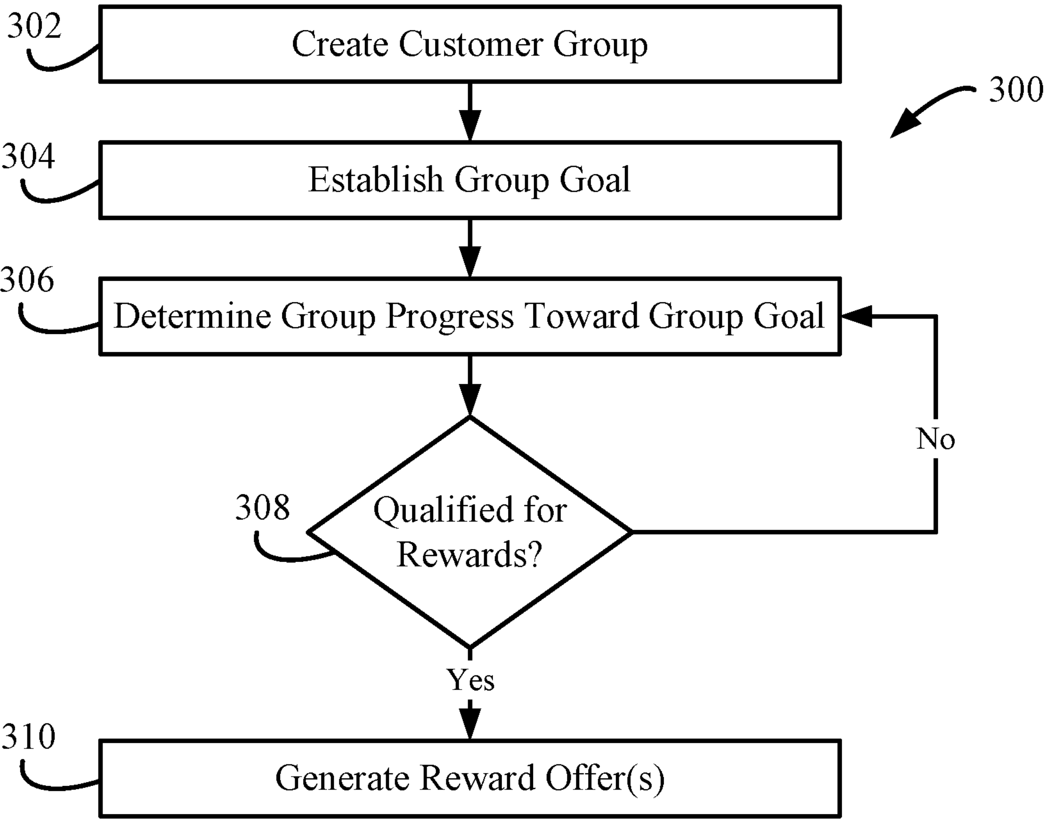
FIG. 3 is a flow diagram of a method for providing group-based goal achievement rewards, according to an example embodiment.

Referring now to FIG. 3, a flow diagram of a method 300 for providing group-based goal achievement rewards is shown, according to an example embodiment. For example, the method 300 relates to creating groups of customers having similar backgrounds and working toward similar goals, establishing group goals associated with the created groups and the individual goals of the customers within the groups, determining group progress toward the corresponding group goals, and generating reward offers for the customer groups upon determining that the groups qualify.

As shown, the method 300 begins by the provider computing system 104 creating a customer group, at step 302. In some instances, the customer group may be created by the provider computing system 104 based various customer characteristics and corresponding customer goals. For example, in some instances, after providing a customer with various recommended actions, as discussed above, the goal achievement circuit 124 may allow the customer to initiate the creation of or, if a corresponding customer group already exists, join an existing customer group that includes other customers having a similar background and/or trying to achieve a similar customer goal.

As will be discussed in detail below, with reference to FIGS. 6 and 7, the customer groups may be created within the context of a customer group goal achievement platform provided via a banking application or a banking website provided by the provider computing system 104 (e.g., the goal achievement circuit 124) and configured to generate and provide a variety of user interfaces (e.g., user interface 600 and user interface 700 shown in FIGS. 6 and 7) associated with the various functionalities described herein.

Figure 6:
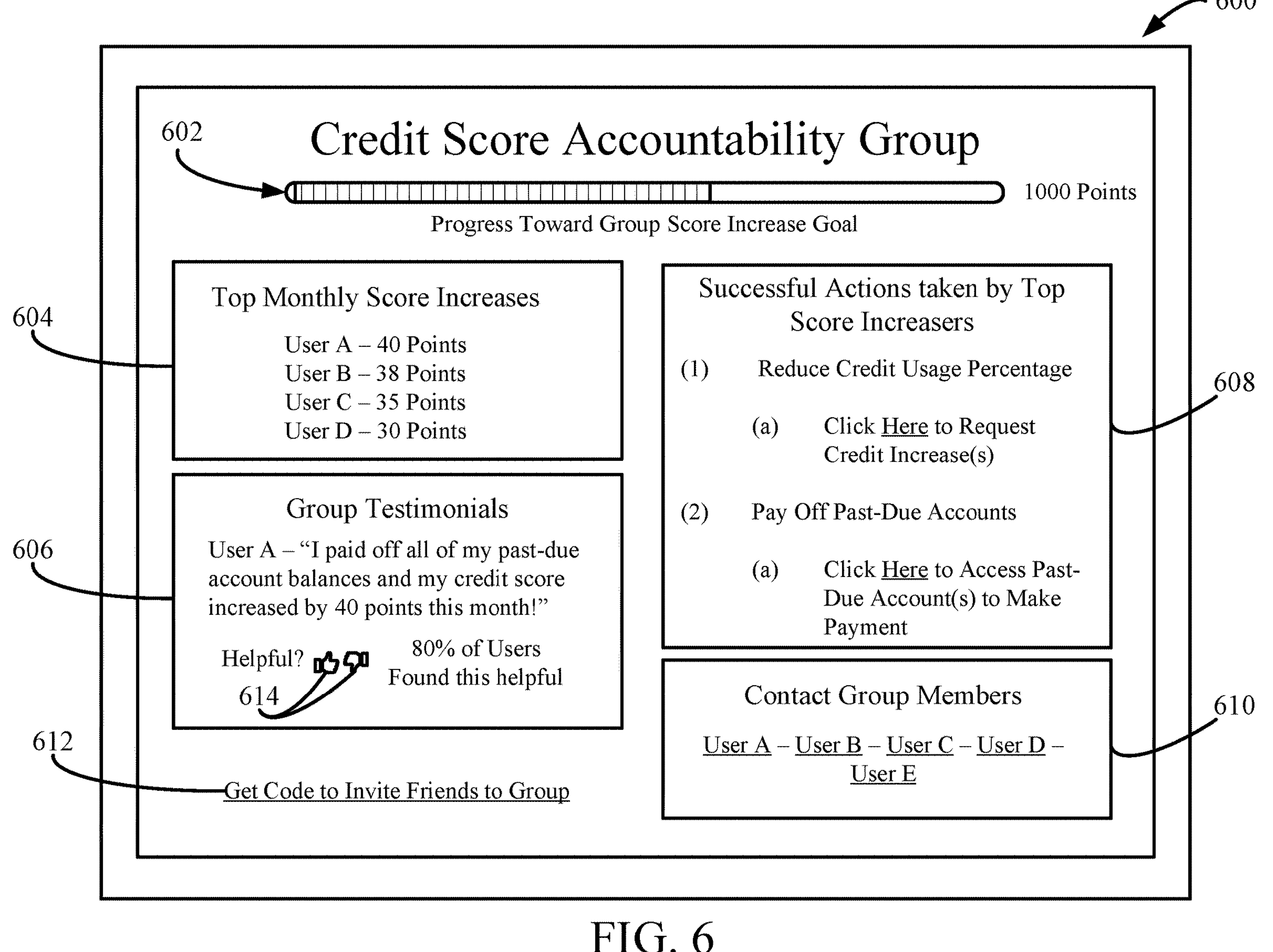
FIG. 6 is another graphical user interface including a customer group page, according to an example embodiment.

For example, each customer group may have a corresponding customer group page (e.g., similar to the user interface 600 shown in FIG. 6). Within the context of the customer group page, the customers may share various information pertaining to customer goals and actions they have taken to achieve those goals with other customers within the customer group. For example, in the context of a customer group aimed at raising credit scores, customers may share their respective credit scores, credit score increases, and/or various personal advice for raising credit scores within the context of the customer group. The customers may further be allowed to directly communicate with each other via messaging and/or interactive message boards on the customer group page. In some instances, various information shared between customers may further be anonymized or otherwise generalized to provide privacy to customers, while still allowing the customers to collaborate and share advice pertaining to achieving various customer goals. For example, in some instances, credit profiles, credit scores, and/or various other sensitive or personal information may be anonymized by having customers use pseudonyms or selecting avatars to be used within the customer groups. In some instances, instead of specific information being used (e.g., a specific credit score), the customer's information is generalized to falling within a broader classifying range (e.g., a credit score between 600 and 650).

Once the customer group has been created, at step 302, a group goal may be established, at step 304. In some instances, the group goal can be a collective amount of progress made by each group member toward their respective goal. For example, if the group is aimed at increasing credit scores, the group goal could be a collective (i.e., aggregated) number of points gained by each customer within the group to be achieved. If the group is aimed at reducing outstanding debt, the group goal could be a collective amount of debt eliminated by each customer within the group to be achieved. In some instances, the group goal can be to make more progress (i.e., beat) a competing group having a similar group goal. For example, if the group is aimed at increasing credit scores, the group goal could be to increase the group's collective credit score by more than a competing group. It will be appreciated that a variety of group-based goals may be implemented without departing from the scope of the present disclosure.

Once the group goal has been created, at step 304, the provider computing system 104 can determine a group progress toward the group goal, at step 306. For example, in some instances, the provider computing system 104 (e.g., the goal achievement circuit 124) can establish a baseline starting point for the group at a given point in time and then track or otherwise monitor progress over a certain period of time. In some instances, the established goal may be comprise a challenge-type goal, where the group is incentivized to make a predetermined amount of progress within a certain amount of time (e.g., raising a collective credit score of the group by 1000 points). In some instances, the progress can be determined on a continuous basis. In some other instances, the progress can be checked on a periodic basis (e.g., daily, weekly, monthly).

The provider computing system 104 then determines whether the customer group qualifies for a reward, at step 308. If the customer group qualifies for the reward, the provider computing system 104 then generates a reward offer, at step 310. For example, if the customer group meets their goal, the provider computing system 104 (e.g., the goal achievement circuit 124) may provide each of the customers within the group with an individual reward, such as, for example, a lower rate on a loan (e.g., a personal loan, a mortgage), a cash rewards, a discount at a merchant, or any other suitable type of reward.

Referring now to FIGS. 4-7 generally, various graphical user interfaces are shown, according to example embodiments. It will be appreciated that the various graphical user interfaces are provided as examples and are in no way meant to be limiting. In some instances, the various graphical user interfaces provided to the customer device 102 may include additional information, interactive features, and/or other elements generally, in the same or different arrangements, without departing from the scope of the present disclosure.

Figure 4:
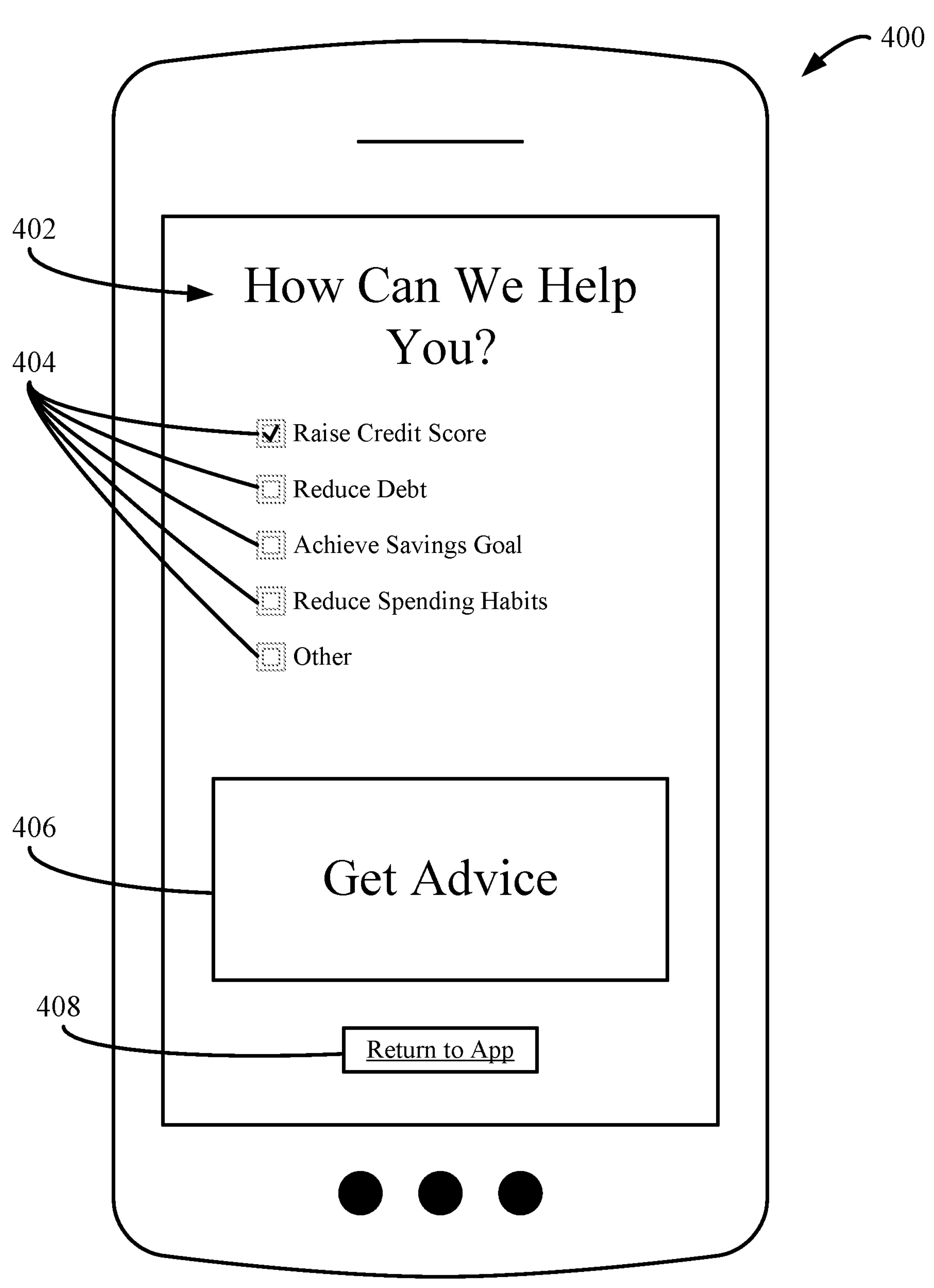
FIG. 4 is a graphical user interface that allows for a customer to select one or more goals, according to an example embodiment.

Referring now to FIG. 4, a graphical user interface 400 is shown, according to an example embodiment. As illustrated, the graphical user interface 400 includes a prompt 402, various goal selection buttons 404, an advice retrieval button 406, and a return button 408. In some instances, the prompt 402 instructs the customer to select one or more goals for which to receive advice, as described herein. The goal selection buttons 404 are selectable on the graphical user interface 400 and allow the customer to indicate which of a variety of goals they wish to receive advice and/or recommendations for. For example, in some instances, the goal selection buttons 404 may include buttons for raising the customer's credit score, reducing the customer's debt, achieving the customer's saving's goal, reducing the customer's spending habits, and an "other" button (e.g., configured to allow the customer to specify a non-listed goal). The customer may then interact with or press the advice retrieval button 406 to be provided with an advice page (e.g., graphical user interface 500, shown in FIG. 5) or the return button 408 to return to a main application provided by the provider institution.

Figure 5:
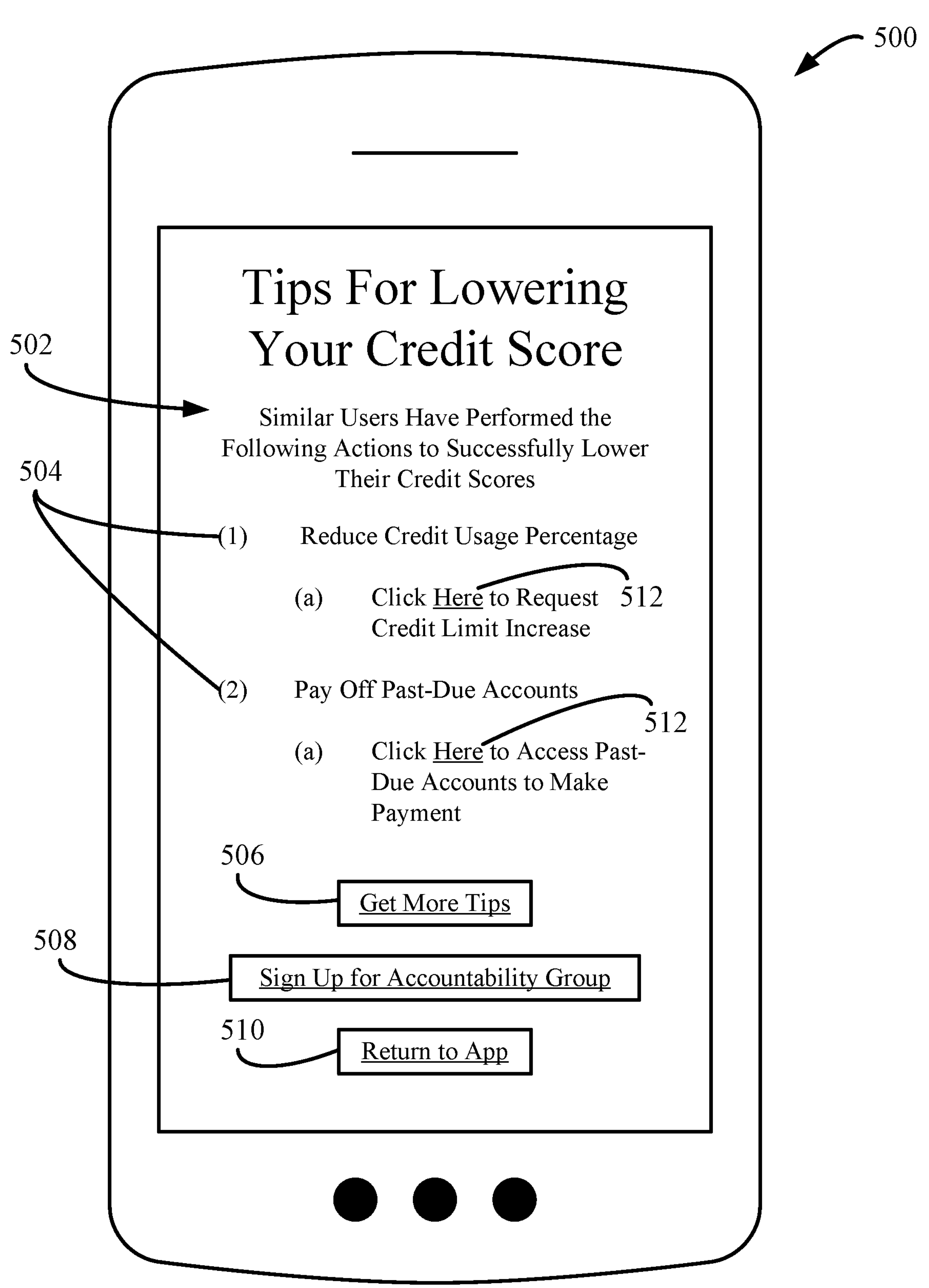
FIG. 5 is another graphical user interface including various recommended actions for the customer to perform to achieve a selected goal, according to an example embodiment.

Referring now to FIG. 5, a graphical user interface 500 is shown, according to an example embodiment. In some instances, the graphical user interface 500 is displayed to the customer upon the customer pressing the advice retrieval button 406 shown in FIG. 4.

As illustrated, the graphical user interface 500 includes a prompt 502, various goal achievement advice or tips 504, an additional tips button 506, a customer group registration button 508, and a return button 510. In some instances, the prompt 502 explains to the customer that the tips 504 are actions taken by other similar customers to achieve the same goal(s) selected by the customer. As illustrated, each of the tips 504 may include a corresponding link 512 configured to perform the suggested advice. For example, in the illustrated example provided in FIG. 5, a first link 512 is configured to allow the customer to request a credit limit increase to reduce their overall credit usage percentage and a second link 512 is configured to allow the customer to access past-due accounts to make one or more payments. It will be appreciated that, in other examples, the graphical user interface 500 could further include various additional links for other actions or to provide additional information, as desired for a given application. For example, in some instances, one or more links (e.g., similar to the links 512) could be included and be configured to allow the customer to open a new credit card, apply for a new loan, open or close one or more accounts, retrieve various news pertaining to the customer goal, or any other suitable action.

The customer can further select the additional tips button 506 to view additional advice on how to achieve their goal, the customer group registration button 508 to sign up for a customer accountability group (e.g., the customer group discussed above, with respect to FIG. 3), or the return button 510 to return to the main application provided by the provider institution.

Referring now to FIG. 6, a graphical user interface 600 is shown, according to an example embodiment. In some instances, the graphical user interface 600 may be displayed to the user upon the user selecting the customer group registration button 508 shown in FIG. 5. In some instances, the graphical user interface 600 may be reached via a website provided and supported by the provider institution.

As illustrated, the graphical user interface 600 includes a group progress tracking bar 602, a top achievers tile 604, a testimonials tiles 606, a recommended actions tile 608, a group member contact tile 610, and an invitation link 612. In some instances, the group progress tracking bar 602 provides a visual representation of the group's collective progress toward the established group goal. For example, if the group goal is to collectively increase their credit scores by 1000 points, the group progress tracking bar 602 may provide a visual representation of how many points out of 1000 the group has increased their credit scores by. It will be appreciated that other metrics may be used depending on the group goal (e.g., amount of debt eliminated, amount of money saved).

The top achievers tile 604 is configured to display a list of the top achievers within the customer group. For example, as shown in FIG. 6, the top achievers for a group trying to increase their credit scores may be ranked in order of the most credit score points earned. In some instances, instead of listing specific customer names, the top achievers tile 604 may include anonymized customer information (e.g., pseudonyms or avatars) to allow for privacy between customers.

The testimonials tile 606 is configured to display testimonials provided by customers within the group. As illustrated, in some instances, the testimonials tile 606 further includes selectable interaction buttons 614 configured to allow customers to provide feedback and/or vote on other customer's advice. For example, in some instances, as shown in FIG. 6, the testimonials tile 606 shows how helpful customers within the group have found a particular piece of advice to be. In some instances, the testimonials tile 606 further includes a description of how many users have used a given piece of advice in a given timeframe (e.g., "3 customers have used this advice today").

In some instances, the provider computing system 104 (e.g., the goal achievement circuit 124) may provide one or more rewards to customers who provide helpful advice. For example, if a predetermined threshold of customers (e.g., 80%) find a piece of advice helpful, the goal achievement circuit 124 may be configured to automatically generate and transmit a reward to the customer device 102 associated with the customer who posted the advice (e.g., the testimonial).

The recommended actions tile 608 may be include substantially similar recommended actions to those discussed above, with respect to FIG. 5. The recommended actions tile 608 may similarly include various links configured to allow the customers to perform the recommended actions. In some instances, the recommended actions tile 608 may further include selectable interaction buttons similar to the selectable interaction buttons 614 to allow customers to provide feedback and/or vote on the various recommended actions. In some instances, the goal achievement circuit 124 may utilize the customer's feedback as additional training data to continuously train the machine learning models discussed herein.

The group member contact tile 610 is configured to allow the group members to contact one another. In some instances, as shown in FIG. 6, the group member contact tile 610 includes a list of the group members, each linked to allow for a customer viewing the graphical user interface 600 to click on a particular customer to receive contact information associated with that customer. In some instances, the group member contact tile 610 may additionally include live-feed chat or message board configured to allow for the group members to create posts and interact publicly to share advice and discuss successes/failures with one another.

The invitation link 612 may be used by the customers to obtain a code, link, or other transmittable element that may be sent by the customer to one or more other customers or non-customers to invite those customers or non-customers to join the group.

Figure 7:
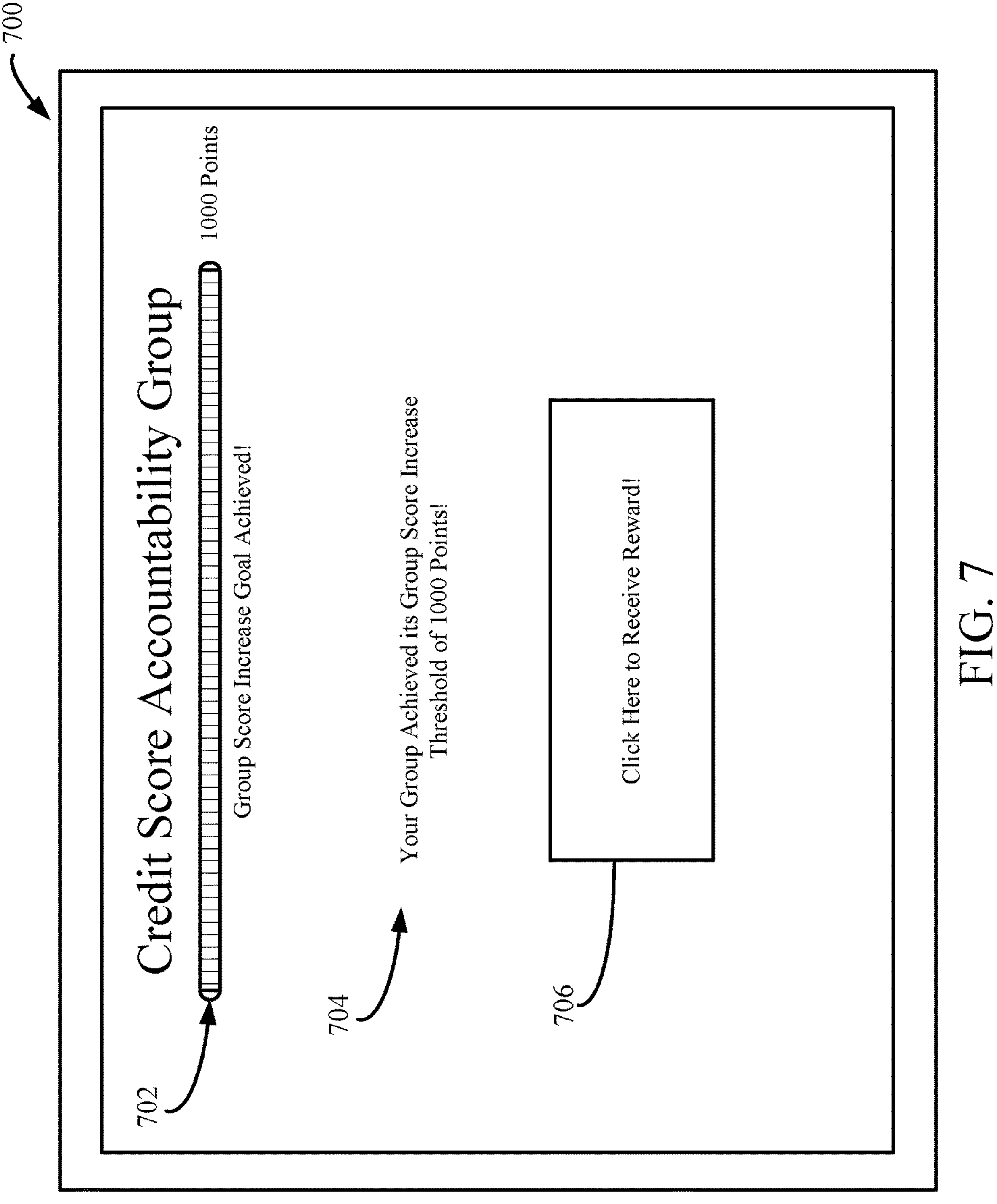
FIG. 7 is another graphical user interface including a customer group achievement award, according to an example embodiment.

Referring now to FIG. 7, a graphical user interface 700 is shown, according to an example embodiment. In some instances, the graphical user interface 700 may be displayed in response to the customer group achieving the group goal. As illustrated, the graphical user interface 700 includes a group progress tracking bar 702 (e.g., similar to the group progress tracking bar 602), a prompt 704 indicating that the customer group has reached the group goal, and a reward redemption button 706. The customer may click on the reward redemption button 706 to receive the reward associated with the customer group achieving the group goal.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 1(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An exemplary system for implementing the overall system or portions of the embodiments might include a general-purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A computer-implemented method comprising:

determining, by a provider computing system associated with a provider, a financial goal of a first customer;

identifying, by the provider computing system, one or more second customers similar to the first customer based on a characteristic of the first customer;

determining, by the provider computing system using a machine learning model, one or more actions taken by the one or more second customers to achieve or progress toward the financial goal based on stored information associated with the one or more second customers achieving or progressing toward the financial goal;

training, by the provider computing system, the machine learning model to identify a customer subset of the one or more second customers that achieved the financial goal faster than a threshold time and a plurality of progress actions, the plurality of progress actions comprising an action subset of the one or more actions that caused the greatest progress to reaching the financial goal;

training, by the provider computing system, the machine learning model to determine one or more recommended actions for the first customer to take based on the customer subset that achieved the financial goal faster than the threshold time and the plurality of progress actions;

generating, by the provider computing system, a graphical user interface including a first indication of the one or more recommended actions for the first customer to take to achieve increased progress towards the financial goal;

transmitting, by the provider computing system, the graphical user interface to a customer device associated with the first customer;

receiving, by the provider computing system, feedback comprising a recommended action of the one or more recommended actions performed by the first customer and a change in progress of the first customer achieving the financial goal based on the recommended action;

retraining, by the provider computing system, the machine learning model to (i) determine one or more new recommended actions for the first customer to take to achieve increased progress towards the financial goal based on the customer subset, the plurality of progress actions, and the feedback, and (ii) exclude one or more prior recommended actions from the one or more new recommended actions, the one or more prior recommended actions associated with achievement or progression toward the financial goal at or before a threshold time period; and in response to retraining the machine learning model, automatically updating, by the provider computing system, the graphical user interface to remove the first indication and include a second indication of the one or more new recommended actions excluding the one or more prior recommended actions.

2. The computer-implemented method of claim 1, wherein determining the one or more actions taken by the one or more second customers to achieve the financial goal comprises:

receiving, by the provider computing system, indications of the one or more actions taken by the one or more second customers to achieve the financial goal from one or more second customer devices associated with the one or more second customers;

storing, by the provider computing system, the indications of the one or more actions taken within a goal achievement database; and upon identifying the one or more second customers based on the characteristic, retrieving, by the provider computing system, the indications of the one or more actions from the goal achievement database.

3. The computer-implemented method of claim 1, further comprising:

receiving, by the provider computing system, goal achievement training data and action training data associated with the customer subset, the goal achievement training data indicating an advancement toward the financial goal for each customer, the action training data indicating one or more actions taken by each customer; and training, by the provider computing system, the machine learning model using the goal achievement training data and the action training data.

4. The computer-implemented method of claim 3, wherein determining the one or more actions taken by the one or more second customers to achieve the financial goal comprises:

inputting, by the provider computing system, initial goal achievement data and initial action data associated with one or more initial customers into the machine learning model to train the machine learning model;

monitoring, by the provider computing system, ongoing customer goal achievement progress and corresponding ongoing actions taken by one or more monitored customers;

inputting, by the provider computing system, the ongoing customer goal achievement progress and the corresponding ongoing actions to continuously train the machine learning model; and receiving, by the provider computing system, the one or more actions taken by the one or more second customers to achieve the financial goal from the machine learning model.

5. The computer-implemented method of claim 4, wherein determining the one or more actions taken by the one or more second customers to achieve the financial goal comprises:

determining, by the provider computing system, one or more first actions taken by the one or more second customers to achieve the financial goal at a first rate; and determining, by the provider computing system, one or more second actions taken by the one or more second customers to achieve the financial goal at a second rate, the second rate being faster than the first rate, wherein the graphical user interface includes the one or more first actions, an indication of the first rate, the one or more second actions, and an indication of the second rate.

6. The computer-implemented method of claim 1, wherein the graphical user interface allows for the first customer to communicate with the one or more second customers.

7. The computer-implemented method of claim 1, wherein the graphical user interface allows for the first customer to indicate whether the one or more actions helped the first customer achieve the financial goal via one or more of a voting interaction feature or a testimonial dialogue entry feature.

8. A provider computing system associated with a provider, the provider computing system comprising:

one or more processing circuits including one or more processors coupled to one or more memory devices, the one or more memory devices having instructions stored thereon that, when executed by the one or more processors, cause the one or more processors to:

determine a financial goal of a first customer;

identify one or more second customers similar to the first customer based on a characteristic of the first customer;

determine, using a machine learning model, one or more actions taken by the one or more second customers to achieve or progress toward the financial goal based on stored information associated with the one or more second customers achieving or progressing toward the financial goal;

train the machine learning model to identify a customer subset of the one or more second customers that achieved the financial goal faster than a threshold time and a plurality of progress actions, the plurality of progress actions comprising an action subset of the one or more actions that caused the greatest progress to reaching the financial goal;

train the machine learning model to determine one or more recommended actions for the first customer to take based on the customer subset that achieved the financial goal faster than the threshold time and the plurality of progress actions;

generate a graphical user interface including a first indication of the one or more recommended actions for the first customer to take to achieve increased progress towards the financial goal;

transmit the graphical user interface to a customer device associated with the first customer;

receive feedback comprising a recommended action of the one or more recommended actions performed by the first customer and a change in progress of the first customer achieving the financial goal based on the recommended action;

retrain the machine learning model to (i) determine one or more new recommended actions for the first customer to take to achieve increased progress towards the financial goal based on the customer subset, the plurality of progress actions, and the feedback, and (ii) exclude one or more prior recommended actions from the one or more new recommended actions, the one or more prior recommended actions associated with achievement or progression toward the financial goal at or before a threshold time period; and in response to retraining the machine learning model, automatically update the graphical user interface to remove the first indication and include a second indication of the one or more new recommended actions excluding the one or more prior recommended actions.

9. The provider computing system of claim 8, wherein the one or more second customers are members in a registered group, the registered group comprising a group of customers each attempting to achieve the financial goal, and the instructions further cause the one or more processors to:

receive a request to join the registered group from the first customer; and provide a group progress reward for a collective amount of progress achieved by the registered group toward reaching the financial goal.

10. The provider computing system of claim 9, wherein the group progress reward is provided in response to the collective amount of progress passing a progress threshold, and the graphical user interface further includes an indication of the collective amount of progress and the progress threshold.

11. The provider computing system of claim 9, wherein the group progress reward is provided in response to the collective amount of progress of the registered group during a competition period exceeding a competing collective amount of progress of a competing registered group, and the graphical user interface further includes an indication of the collective amount of progress and an indication of the competing collective amount of progress.

12. The provider computing system of claim 9, wherein the group progress reward is one or more of a financial reward or an interest rate offer provided to each member of the registered group.

13. The provider computing system of claim 9, wherein the graphical user interface includes a code configured to allow other customers to join the registered group.

14. The provider computing system of claim 9, wherein the first customer and the one or more second customers are anonymized within the registered group using one or more of a pseudonym or an avatar.

15. A non-transitory computer-readable medium having instructions stored thereon that, when executed by at least one processing circuit of a provider computing system associated with a provider, cause operations comprising:

determining a financial goal of a first customer;

identifying one or more second customers similar to the first customer based on a characteristic of the first customer;

determining, using a machine learning model, one or more actions taken by the one or more second customers to achieve or progress toward the financial goal;

training the machine learning model to identify a customer subset of the one or more second customers that achieved the financial goal faster than a threshold time and a plurality of progress actions, the plurality of progress actions comprising an action subset of the one or more actions that caused the greatest progress to reaching the financial goal;

training the machine learning model to determine one or more recommended actions for the first customer to take based on the customer subset that achieved the financial goal faster than the threshold time and the plurality of progress actions;

generating a graphical user interface including a first indication of the one or more recommended actions for the first customer to take to achieve increased progress towards the financial goal;

transmitting the graphical user interface to a customer device associated with the first customer;

receiving feedback comprising a recommended action of the one or more recommended actions performed by the first customer and a change in progress of the first customer achieving the financial goal based on the recommended action;

retraining the machine learning model to (i) determine one or more new recommended actions for the first customer to take to achieve increased progress towards the financial goal based on the customer subset, the plurality of progress actions, and the feedback, and (ii) exclude one or more prior recommended actions from the one or more new recommended actions, the one or more prior recommended actions associated with achievement or progression toward the financial goal at or before a threshold time period; and in response to retraining the machine learning model, automatically updating the graphical user interface to remove the first indication and include a second indication of the one or more new recommended actions excluding the one or more prior recommended actions.

16. The non-transitory computer-readable medium of claim 15, wherein the financial goal is a credit score goal.

17. The non-transitory computer-readable medium of claim 15, wherein the characteristic comprises one or more of an income level of the first customer, a disposable income level of the first customer, a geographic location of the first customer, an age of the first customer, an education level of the first customer, an occupation of the first customer, a marital status of the first customer, a number of dependents that the first customer has, the financial goal of the first customer, or a credit score of the first customer.

18. The non-transitory computer-readable medium of claim 15, wherein the one or more actions comprise one or more of lowering a credit utilization percentage or paying off a debt.

19. The non-transitory computer-readable medium of claim 15, wherein the graphical user interface further includes one or more links selectable by the first customer to perform the one or more actions.

20. The non-transitory computer-readable medium of claim 15, wherein the operations further comprise:

determining that the first customer has achieved progress toward the financial goal exceeding a progress threshold; and transmitting a prompt to the customer device requesting information from the first customer pertaining to the achieved progress.

* * * * *